United States Patent [19]

Marhold et al.

[11] Patent Number: 4,749,813
[45] Date of Patent: Jun. 7, 1988

[54] 4-ALKYL-2-TRIFLUOROMETHYLANILINES

[75] Inventors: Albrecht Marhold; Gerhard Wolfrum, both of Leverkusen, Fed. Rep. of Germany

[73] Assignee: Bayer Aktiengesellschaft, Leverkusen, Fed. Rep. of Germany

[21] Appl. No.: 454,828

[22] Filed: Dec. 30, 1982

[30] Foreign Application Priority Data

Jan. 15, 1982 [DE] Fed. Rep. of Germany ....... 3201112

[51] Int. Cl.[4] .................... C07C 85/20; C07C 85/24; C07C 85/26; C09B 29/01
[52] U.S. Cl. ............................ 564/442; 534/581; 534/582; 534/790; 534/793; 534/845; 534/846; 534/856; 534/878; 564/409; 564/417; 564/419; 564/420
[58] Field of Search ................ 260/205; 564/442, 449, 564/462

[56] References Cited

U.S. PATENT DOCUMENTS 1,999,185  4/1935  Engelmann ......................... 260/205
4,172,095 10/1979  Steinman et al. ................... 564/442

FOREIGN PATENT DOCUMENTS 2630562  1/1978  Fed. Rep. of Germany ...... 564/462

OTHER PUBLICATIONS

Andre et al., Chemical Abstracts, vol. 93, #90187p (1980).
Beilstein, "Handbuch der Organischen Chemie", vol. XII, Second Supplement, p. 453 (1950).
Blakitnyi et al., Chemical Abstracts, vol. 85, #160356d (1976).
Pissiotas et al., Chemical Abstracts, vol. 89, #59765u (1978).

*Primary Examiner*—Floyd D. Higel
*Attorney, Agent, or Firm*—Sprung Horn Kramer & Woods

[57] ABSTRACT

4-Alkyl-2-trifluoromethylanilines, in particular the 4-isopropyl derivative, are starting materials for preparing valuable azo dyestuffs. While the nonionic dyestuff types can preferably be used in transfer printing synthetic hydrophobic fibre materials, the sulpho-containing dyestuffs—in particular those based on "gamma acid"—are suitable for dyeing polyamides.

3 Claims, No Drawings

4-ALKYL-2-TRIFLUOROMETHYLANILINES

The invention relates to new aniline derivatives of the formula

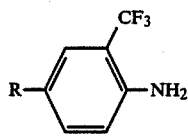  (I)

wherein R denotes a $C_1$–$C_6$-alkyl radical and to their preparation and use for building azo dyestuffs.

While some of the isomeric 4-trifluoromethylanilines are already known (compare, for example, U.S. Pat. specification No. 2,448,870), a process for preparing the materials according to the invention has hitherto not been disclosed.

It has now been found that compounds of the formula I are obtained in a simple manner when corresponding 3-alkylbenzotrifluorides are nitrated by methods which are in themselves known and the nitro group introduced is then reduced.

The nitration is carried out at low temperatures, (for example 0°–20° C.), for example using nitric acid or so-called "mixed acid".

The reduction can be carried out with the aid of reducing agents, such as iron, tin or zinc, or catalytically.

Among the 3-alkylbenzotrifluorides required as starting materials only the simple representatives, such as, for example, the methyl and ethyl compounds, are known (compare, for example, J.A.C.S. 74, 4,079 (1952) and ibid. 78, 3,393 (1956) and Org. Mass. Spectr. 2, 1,317 (1969)).

The particularly interesting branched $C_3$–$C_6$-alkyl homologues have, however, hitherto not been described in the literature. These compounds are obtained by reacting benzotrifluoride with corresponding alkenes in the presence of Lewis acids under the conditions of the Friedel-Crafts synthesis. Preferable alkenes to be used are propene and but-1-ene.

It has also been found that the new anilines are highly suitable for preparing valuable azo dyestuffs of the formula

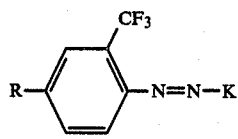  (II)

wherein K denotes the radical of a coupling component.

Suitable coupling components are in principle all compounds customary in azo chemistry, in particular those of the aniline, phenol, naphthol, naphthylamine, pyrazole, indole and pyridine series.

Preferable coupling components are compounds of the aniline, naphthol and naphtylamine series.

Among these, in turn, the following compound classes are to be emphasised as particularly preferable according to the intended field of use:

Examples of dyestuffs suitable for so-called heat transfer printing are in particular those based on coupling components of the formula

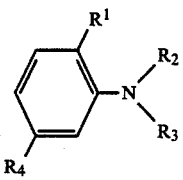  (III)

wherein

R represents H, Cl, $OCH_3$ or $OC_2H_5$, $R_2$ represents H, $C_2$–$H_4$-alkyl, cyanoethyl, chloroethyl, benzyl or $C_1$–$C_4$-alkoxy-$C_2$–$C_4$-alkyl, $R_3$ represents identical or different $R_2$ and $R_4$ represents H, $CH_3$, $OCH_3$, $OC_2H_5$, Cl, $CF_3$ or, if appropriate, also $NHCOCH_3$.

Coupling components particularly suitable for preparing acid dyestuffs for dyeing synthetic and natural polyamides are of the formulae (a) 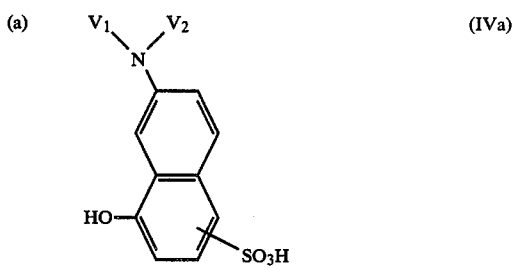  (IVa)

wherein $V_1$ represents H, $C_1$–$C_4$-alkyl, cyclohexyl, phenyl-$C_1$–$C_3$-alkyl or phenyl optionally substituted by $C_1$–$C_4$-(O)-alkyl or Cl and $V_2$ represents H or $C_1$–$C_4$-alkyl; (the so-called gamma acid is preferable);

(b) 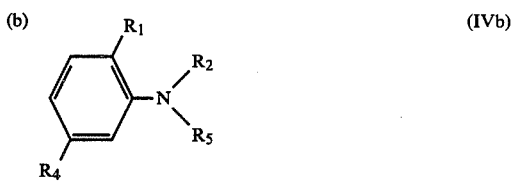  (IVb)

wherein $R_1$, $R_2$ and $R_4$ have the abovementioned meaning and $R_5$ represents sulphobenzyl, sulphoalkyl (for example sulphoethyl) or sulphatoethyl; and (c) 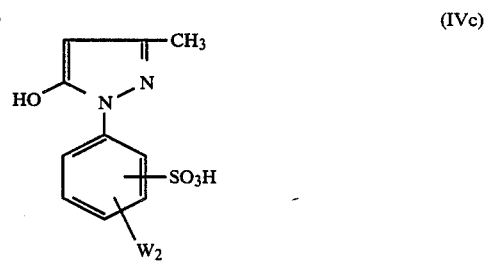  (IVc)

wherein $W_1$ denotes $NH_2$ or preferably OH and $W_2$ denotes H, Cl or $CH_3$; and (d) 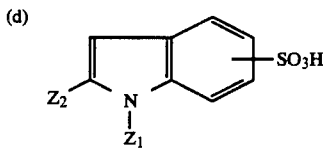 (IVd)

wherein
$Z_1$ denotes H or $C_1$-$C_4$-alkyl and
$Z_2$ denotes $Z_1$ or phenyl.

The new dyestuffs are obtained in a known manner by diazotisation and coupling (compare, for example, German Offenlegungsschriften Nos. 2,728,073 and 2,364,475).

The new water-insoluble and water-soluble dyestuffs based on diazo components according to the invention and on the abovementioned coupling components are distinguished by interesting, unforeseeable application properties.

EXAMPLE 1

Preparation of 3-isopropylbenzotrifluoride 500 ml of hydrogen fluoride are initially introduced at 0° C. into an autoclave stable to hydrogen fluoride, and a mixture of 2,000 g of benzotrifluoride and 1,000 g of isopropyl chloride is added. After 3 bar of nitrogen have been injected the batch is stirred for 6 hours at 50° C., and the hydrogen chloride formed is continually let down under 8 bar. After the batch has cooled down, the hydrogen fluoride is distilled off, and the residue (2,430 g) is analyzed by gas chromatography.

The residue contains:
8.6% of isopropyl chloride
38.2% of benzotrifluoride
24.2% of 3-isopropylbenzotrifluoride
5.8% of 4-isopropylbenzotrifluoride
15.3% of 3,5-diisopropylbenzotrifluoride and
6.3% of 2,5-diisopropylbenzotrifluoride.

The 3-isopropylbenzotrifluoride desired can be isolated in pure form by distillation (boiling point: 53° C./16 mbar; $n_D^{20}$: 1.4360).

Other alkenes, such as, for example, but-1-ene, can also be used correspondingly.

EXAMPLE 2

412 g of 3-isopropylbenzotrifluoride are initially introduced into a stirred vessel, and 480 g of mixed acid O (33% of $HNO_3$ and 67% of $H_2SO_4$) are added dropwise at 10° C. with vigorous stirring. After the addition is complete, the mixture is stirred for a further 1 hour at 10° C. and for 2 hours at 20° C. and then discharged onto 500 g of ice. The organic phase is taken up in dichloromethane, washed with water, dried and distilled over a column.

401 g of 2-nitro-5-isopropylbenzotrifluoride pass over at a boiling point of 134°-35° C./20 mbar ($n_D^{20}$: 1.4776).

EXAMPLE 3

330 g of 2-nitro-5-isopropylbenzotrifluoride in 1,200 ml of methanol are initially introduced into a hydrogenation apparatus, and 30 g of Raney nickel are added. After the system has been flushed with hydrogen, a hydrogenation is carried out at 25°-45° C. under a pressure of 30 bar of hydrogen. After the hydrogen absorption is complete, the solution is filtered to separate off the catalyst. After the solvent has been distilled off, the product is distilled. 280 g of 2-amino-5-isopropylbenzotrifluoride (boiling point: 95°-8° C./18 mbar, $n_D^{20}$: 1.4810) are obtained.

EXAMPLE 4

300 ml of water, 3 ml of concentrated hydrochloric acid and 100 g of iron fillings are initially introduced into a stirred apparatus equipped with a reflux condenser and dropping funnel. 5 ml of dioxane are then added, and the mixture is heated with stirring to 95° C. 50 g of 2-nitro-5-isopropylbenzotrifluoride are added dropwise at this temperature in the course of one hour, and the mixture is stirred for a further 2 hours after the addition is complete. The mixture is then rendered alkaline by means of sodium hydroxide solution, and the product is distilled using steam. 39 g of 2-amino-5-isopropylbenzotrifluoride, which is identical to the product of the catalytic hydrogenation, are obtained.

EXAMPLE 5

50 g of 3-methylbenzotrifluoride are initially introduced at 10° C. into a nitrating beaker, and 60 g of mixed acid are added dropwise with thorough mixing. After the addition is complete, the mixture is stirred for a further 1 hour at 10° C. and then for 1 hour at 20° C. and poured onto ice, and the organic material is separated off, dried and distilled. 57 g of 2-nitro-5-methylbenzotrifluoride pass over at a boiling point of 97°-103° C./14 mbar ($n_D^{20}$: 1.4743).

EXAMPLE 6

56 g of 3-ethylbenzotrifluoride are nitrated analogously to Example 5 by means of 60 g of mixed acid. 61 g of 2-nitro-5-ethylbenzotrifluoride are obtained by distillation (boiling point: 110°-113° C./16 mbar, $n_D^{20}$: 1.4765).

EXAMPLE 7

100 g of iron fillings are heated to 95° C. in 300 ml of water, 5 ml of hydrochloric acid and 5 ml of dioxane in a stirred vessel, and 57 g of 2-nitro-5-methylbenzotrifluoride are added dropwise in the course of about 1 hour. The mixture is stirred for a further 2 hours, and a distillation is then carried out using steam. The organic material extracted with dichloromethane and re-distilled. 42 g (boiling point: 92°-95° C./20 mbar) of 2-trifluoromethyl-4-methylaniline are obtained.

EXAMPLE 8

61 g of 2-nitro-5-ethylbenzotrifluoride were reduced analogously to Example 4 by means of iron. 52 g of 2-trifluoromethyl-4-ethylaniline (boiling point: 96°-8° C./20 mbar, $n_D^{20}$: 1.4788) are obtained.

EXAMPLE 9

20.3 g of 2-amino-5-isopropylbenzotrifluoride are dissolved in 350 ml of water and 30 ml of concentrated hydrochloric acid, and the solution is cooled down to 0° C. and diazotised with a solution of 6.9 g of sodium nitrite in 50 ml of water. After excess nitrous acid has been destroyed with sulphamic acid, the diazonium salt solution is added to a cooled solution at 5° C. for 24.2 g of 6-amino-4-hydroxynaphthalene-2-sulphonic acid (gamma acid) in 300 ml of dimethylformamide, and which had beforehand been adjusted to pH 1 by adding about 5 ml of concentrated hydrochloric acid. The coupling is very rapidly complete at this pH value. The mixture is then stirred for 2 hours at room temperature.

The reaction product is filtered off with suction and dried. 44 g of a red powder of the formula

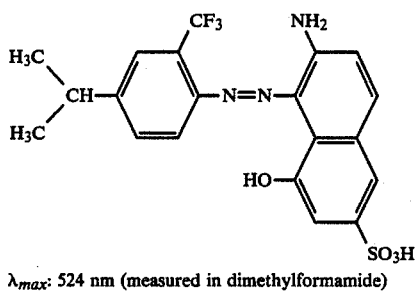

λ$_{max}$: 524 nm (measured in dimethylformamide)

which dyes polyamide fibres a clear red from an aqueous solution, are obtained. The powder produces a clear, somewhat bluish-tinged red on wool.

The dyestuff coupling can also be carried out in an aqueous medium. For this purpose, the diazonium salt solution prepared in accordance with the above instructions is added to a dispersion of 24 g of 6-amino-4-hydroxynaphthalene-2-sulphonic acid in 600 ml of water, and the temperature is maintained by cooling at about 5° C.

If 32.3 g of 1-(2,5-dichloro-4-sulphophenyl)-3-methyl-5-pyrazolone or 21.1 g of 2-methylindole-5-sulphonic acid are used as coupling components in the above example instead of 24.2 g of 6-amino-4-hydroxynaphthalene-2-sulphonic acid and the procedure followed is otherwise analogously to that indicated in the example, dyestuffs of the formula

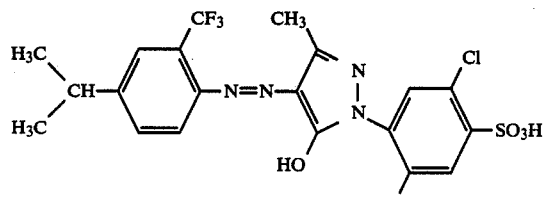

λ$_{max}$: 447 nm (measured in dimethylformamide)

or of the formula

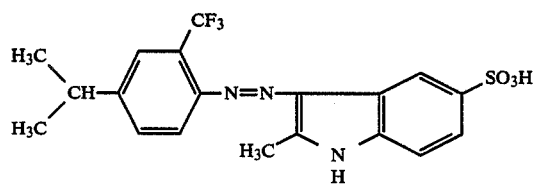

λ$_{max}$: 387 nm (measured in dimethylformamide)

are respectively obtained in the form of yellow powders which dye polyamide in greenish-tinged yellow shades.

EXAMPLE 10

0.1 g of the dyestuff obtained according to Example 9 is dissolved with heating in 100 ml of water. 5 ml of ammonium acetate solution are added, and the solution is diluted with cold water to a volume of 500 ml. 10 g of polyamide fibre material are introduced into this dyebath, which is heated in the course of 20 minutes to the boil, 4 ml of 10% strength acetic acid are added, and the temperature is maintained for 1 hour at the boil. The dyed polyamide is then removed from the dyebath, rinsed thoroughly with hot water and dried at 70° to 80° C. A clear red dyeing is obtained.

EXAMPLE 11

60 g of 1-amino-2-trifluoromethyl-4-isopropylbenzne are added dropwise with stirring to 300 parts of concentrated sulphuric acid, during which addition the temperature should not exceed 20° C. The mixture is then cooled down to 0° C, and nitrosylsulphuric acid prepared by dissolving 20 parts of sodium nitrite in 80 parts of concentrated sulphuric acid is slowly added dropwise at this temperature. The mixture is stirred for about a further 2 hours at 0° C. The diazonium salt solution thus prepared is then gradually added at 0°–5° C. with thorough stirring to a solution of 58 parts of 1-(N-ethyl-N-β-chloroethylamino)-3-methylbenzene in 2,000 parts of water and 50 parts of concentrated sulphuric acid and to which 10 parts of sulphamic acid have been added. The coupling commences immediately. It can be accelerated by buffering the solution at pH 4–5 by means of sodium acetate. After the coupling is complete, the azo dyestuff formed is filtered off, washed with water until salt-free and dried. 105 g of a red dyestuff, which, finished in a customary manner and printed onto a paper carrier, is highly suitable for printing polyester fibre materials using the transfer printing principle (for example 30 seconds at 200° C.), are obtained.

What is claimed is:
1. A compound of the formula

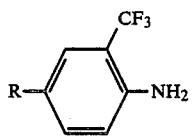

wherein R denotes a C$_1$–C$_6$-alkyl radical.
2. A compound according to claim 1, characterised in that R represents C$_3$–C$_4$-alkyl.
3. A compound according to claim 1, characterised in that R represents isopropyl.

* * * * *

UNITED STATES PATENT AND TRADEMARK OFFICE
CERTIFICATE OF CORRECTION

PATENT NO. : 4,749,813
DATED : June 7, 1988
INVENTOR(S) : Marhold et al

It is certified that error appears in the above-identified patent and that said Letters Patent is hereby corrected as shown below:

| | |
|---|---|
| Col. 2, line 67 | Delete "$W_1$ denotes $NH_2$ or preferably OH and" |
| Col. 4, lines 6 and 39 | Delete "fillings" and substitute --filings-- |
| Col. 4, line 62 | Delete "for 24.2g" and substitute --of 24.2g-- |
| Col. 6, line 18 | Delete "-isopropylbenzne" and substitute -- -isopropylbenzene -- |

Signed and Sealed this

Twenty-first Day of February, 1989

Attest:

DONALD J. QUIGG

Attesting Officer

Commissioner of Patents and Trademarks